United States Patent [19]

Claunch et al.

[11] Patent Number: 5,482,902
[45] Date of Patent: * Jan. 9, 1996

[54] BROWN-PHOTOCHROMIC GLASSES

[75] Inventors: Thomas C. Claunch, Harrodsburg, Ky.; Thomas G. Havens, Painted Post; David J. Kerko, Corning, both of N.Y.

[73] Assignee: Corning Incorporated, Corning, N.Y.

[*] Notice: The portion of the term of this patent subsequent to Oct. 26, 2010, has been disclaimed.

[21] Appl. No.: 361,059

[22] Filed: Dec. 21, 1994

[51] Int. Cl.$^6$ .................................................. C03C 4/06
[52] U.S. Cl. .............................. 501/13; 501/56; 501/66
[58] Field of Search ........................ 501/13, 56, 62, 501/66

[56] References Cited

U.S. PATENT DOCUMENTS

| | | | |
|---|---|---|---|
| 4,251,278 | 2/1981 | Hares . | |
| 4,608,349 | 8/1986 | Kerko et al. . | |
| 4,757,034 | 7/1988 | Prassas . | |
| 5,023,209 | 6/1991 | Grateau et al. . | |
| 5,244,845 | 9/1993 | Kerko et al. . | |
| 5,256,601 | 10/1993 | Kerko et al. | 501/13 |
| 5,300,465 | 4/1994 | Gateau et al. | 501/13 |

Primary Examiner—Karl Group
Attorney, Agent, or Firm—Angela Nwaneri; Clinton S. Janes, Jr.

[57] ABSTRACT

This invention is directed primarily to a composition for a photochromic glass which is essentially colorless in the undarkened state consisting essentially, expressed in terms of weight percent, of

| | | | | | |
|---|---|---|---|---|---|
| $SiO_2$ | 54–58 | $TiO_2$ | 0–2 | PbO | 0–0.8 |
| $B_2O_3$ | 18–22 | $ZrO_2$ | 2–4.5 | $Sb_2O_3$ | 0–0.2 |
| $Al_2O_3$ | 7–8 | Ag | 0.155–0.175 | $Er_2O_3$ | 0–0.5 |
| $Li_2O$ | 3.75–4.5 | Cl | 0.3–0.4 | Au | 0–5 ppm |
| $Na_2O$ | 0–1 | Br | 0.08–0.11 | Pd | 0.8–1.2 ppm |
| $K_2O$ | 5.5–7.5 | CuO | 0.0065–0.01 | | | wherein the mole ratio $Li_2O:Na_2O \geq 9:1$, said glass at a thickness of 2 mm exhibiting a coloration in the fully darkened state corresponding to the chromaticity coordinates, in accordance with the 1931 C.I.E. trichromatic colorimetric system, falling within area IJKLI in the appended drawing.

7 Claims, 1 Drawing Sheet

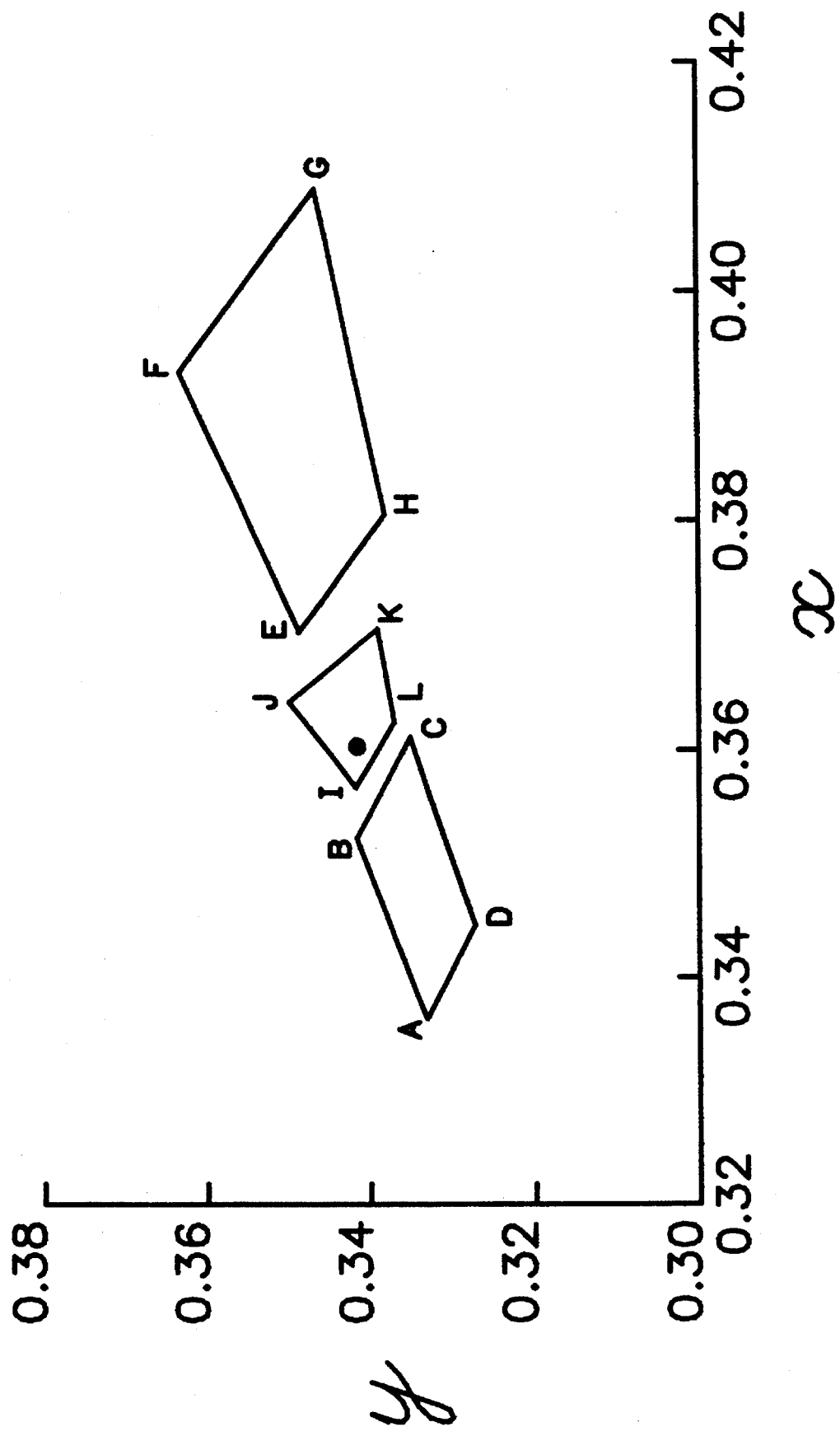

BROWN-PHOTOCHROMIC GLASSES

FIELD OF THE INVENTION

The field of the invention is the production of transparent, substantially colorless photochromic glasses which darken to a critically defined brown coloration when exposed to actinic radiation, most commonly ultraviolet radiation.

BACKGROUND OF THE INVENTION

U.S. Pat. No. 5,244,845 (Kerko et al.) discloses transparent, substantially colorless photochromic glasses designed for use in the fabrication of conventional ophthalmic lenses (a thickness of about 2 mm) and in the fabrication of photochromic glass lens elements (a thickness of about 1 mm) for use in laminated glass-plastic, ophthalmic lens structures, which glasses darken to a specifically limited brown hue, depending upon the thickness of the glass, upon being subjected to actinic radiation.

As explained in that patent, the glass compositions disclosed were devised to constitute an improvement upon the glasses described in U.S. Pat. No. 4,608,349 (Kerko et al.), which glasses had been expressly designed for use as thin lens elements in laminated glass-plastic ophthalmic lens structures and consisted essentially, in weight percent, of

| $SiO_2$ | 54–58 | $ZrO_2$ | 2–4.5 |
| $B_2O_3$ | 18–22 | Ag | 0.2–0.33 |
| $Al_2O_3$ | 7–8 | Cl | 0.3–0.5 |
| $Li_2O$ | 3.75–4.5 | Br | 0.04–0.12 |
| $Na_2O$ | 0–1 | CuO | 0.007–0.012 |
| $K_2O$ | 5.5–7.5 | PbO | 0–0.08 |
| $TiO_2$ | 0–2 | $Sb_2O_3$ | 0–0.2 | wherein the molar ratio $Li_2O:Na_2O \geq 9$. The glasses were stated to exhibit a neutral gray tint in the darkened state and to be essentially colorless in the undarkened state, having a luminous transmittance over the range of about 88–92%.

The basic objective of U.S. Pat. No. 5,244,845 was to develop a thin photochromic lens of about 1 mm thickness capable of darkening to a brown coloration when subjected to actinic radiation, such as to be operable in the above-described laminated lens structure. The patent first acknowledged that a variety of additives was known which can be incorporated into photochromic glasses of specific compositions to develop a brown color therein. Those additives included Au, Pd, SnO, $Fe_2O_3$, NiO, $Er_2O_3$, $Nd_2O_3$, and $Co_3O_4$, the utility of those additives being disclosed in U.S. Pat. No. 4,251,278 (Hares), U.S. Pat. No. 4,757,034 (Prassas), and U.S. Pat. No. 5,023,209 (Grateau et al.). The glasses disclosed in those patents, however, were useful only in standard, 2 mm thick lenses. Thus, there was still the need for photochromic glasses which, at a thickness of about 1 mm, will darken sufficiently in a brown coloration to be operable as a thin glass lens element in the above-described laminated glass-plastic lenses.

That need was satisfied by utilizing the base glass compositions of U.S. Pat. No. 4,608,349, but modifying the Ag and Cl concentrations thereof and adding Pd with, optionally, $Er_2O_3$ and/or Au. Accordingly, the glass compositions recorded in U.S. Pat. No. 5,244,845 consist essentially, in weight percent, of

| $SiO_2$ | 54–58 | $TiO_2$ | 0–2 | PbO | 0–0.08 |
| $B_2O_3$ | 18–22 | $ZrO_2$ | 2–4.5 | $Sb_2O_3$ | 0–0.2 |
| $Al_2O_3$ | 7–8 | Ag | 0.18–0.33 | Er | 0–1 |
| $Li_2O$ | 3.75–4.5 | Cl | 0.25–0.5 | Au | 0–10 ppm |
| $Na_2O$ | 0–1 | Br | 0.04–0.12 | Pd | 1–6 ppm |
| $K_2O$ | 5.5–7.5 | CuO | 0.007–0.013 | | | wherein the mole ratio $Li_2O:Na_2O \geq 9$.

Laboratory investigation and field experience indicated that not only were those glasses operable as thin glass elements, but also were capable of functioning as brown sunglasses in conventional ophthalmic lens thickness (2 mm).

Utilizing the standard light source, viz., Illuminant C, as defined in terms of the 1931 C.I.E. trichromatic colorimetric system, the chromaticity coordinates of those glasses fall within the trapezoid ABCDA in the drawing for a glass of 1.1 mm thickness, and within the trapezoid EFGHE for a glass of 2 mm thickness. The approximate coordinate values for the corner points of those two trapezoidal enclosures are tabulated below:

| Point | x | y |
| --- | --- | --- |
| A | 0.3377 | 0.3337 |
| B | 0.3513 | 0.3422 |
| C | 0.3617 | 0.3315 |
| D | 0.3446 | 0.3265 |
| E | 0.3683 | 0.3478 |
| F | 0.3923 | 0.3613 |
| G | 0.4081 | 0.3452 |
| H | 0.3795 | 0.3365 |

Interviews with potential customers for photochromic glasses exhibiting a brown coloration upon exposure to actinic radiation elicited the opinion that the brown coloration exhibited by the glasses of U.S. Pat. No. 5,244,845 at a thickness of about 2 mm was too reddish-brown in the darkened state. That is, a preference was shown for glasses having a chocolate brown coloration in the fully darkened state corresponding to the chromaticity coordinates that fall within the trapezoid IJKLI in the appended drawing.

Therefore, the primary purpose of the present invention was to devise glass compositions satisfying that preference.

SUMMARY OF THE INVENTION

We have been able to achieve that objective through glasses having base compositions within U.S. Pat. No. 5,244,845, but wherein the concentrations of the "photochromic elements", i.e., Ag, Cl, Br, and CuO, are modified and the level of Pd is severely restricted. Accordingly, the inventive glasses consist essentially, expressed in weight percent, of

| $SiO_2$ | 54–58 | $TiO_2$ | 0–2 | PbO | 0–0.8 |
| $B_2O_3$ | 18–22 | $ZrO_2$ | 2–4.5 | $Sb_2O_3$ | 0–0.2 |
| $Al_2O_3$ | 7–8 | Ag | 0.155–0.175 | $Er_2O_3$ | 0–0.5 |
| $Li_2O$ | 3.75–4.5 | Cl | 0.3–0.4 | Au | 0–5 ppm |
| $Na_2O$ | 0–1 | Br | 0.08–0.11 | Pd | 0.8–1.2 ppm |
| $K_2O$ | 5.5–7.5 | CuO | 0.0065–0.01 | | | wherein the mole ratio $Li_2O: Na_2O \geq 9:1$, and they exhibit a coloration in the fully darkened state corresponding to chromaticity coordinates, in accordance with the 1931 C.I.E. trichromatic colorimetric system, that fall within the area IJKLI in the appended drawing for a glass having a thickness of about 2 mm.

PRIOR ART

The patents discussed above in the Background of the Invention are believed to be the most relevant to the present invention. The disclosure of each is expressly incorporated herein by reference.

BRIEF DESCRIPTION OF THE DRAWING

The single FIGURE comprises a graphical representation of chromaticity coordinates.

GENERAL DESCRIPTION OF THE INVENTION

In like manner to U.S. Pat. No. 5,244,845, the present invention had its genesis in a photochromic glass, identified by Corning Incorporated, Corning, New York, as Code 8134, which glass has a composition encompassed within the ranges of U.S. Pat. No. 4,608,349. That glass has the following approximate composition, as expressed in terms of approximate weight percent:

| $SiO_2$ | 54.5 | $K_2O$ | 6.0 | PbO | 0.03 |
|---|---|---|---|---|---|
| $B_2O_3$ | 20.4 | $TiO_2$ | 1.0 | $Sb_2O_3$ | 0.01 |
| $Al_2O_3$ | 7.3 | $ZrO_2$ | 4.7 | Br | 0.11 |
| $Li_2O$ | 4.3 | Ag | 0.25 | Cl | 0.36 |
| $Na_2O$ | 0.8 | CuO | 0.008 | | |

Code 8134 glass is a particularly desirable glass, not only for its excellent darkening and fading characteristics, but also because of the good melting and forming characteristics exhibited thereby. That combination of properties led to the development of the glasses disclosed in U.S. Pat. No. 5,244,845 utilizing that glass as the basis therefor, and fostered our use of that glass as the basis of our research.

It is well recognized that the addition of Pd alone imparts a brown color as the glass is darkened. As noted in U.S. Pat. No. 5,244,845, however, the depth of color obtainable upon darkening diminishes as the amount of Pd is increased. Hence, the preferred range of Pd was 2–4 ppm. But, as also noted in the patent, larger amounts of Pd resulted in developing a fixed tint in the glass which is undesirable in ophthalmic lenses.

Simply reducing the Pd content below about 1 ppm can lead to an undesirable "washed-out" brown coloration when the glass is darkened. We found, however, that by reducing the concentration of Ag and utilizing Pd levels at about 1 ppm, a rich, chocolate brown coloration can be achieved which demonstrates chromaticity coordinates within the area IJKLI in the appended drawing.

We do not understand the phenomenon. There apparently is some interaction taking place between the Pd and the Ag (and/or the Cl and Br at the lower concentrations of Ag). We have not as yet theorized the mechanism underlying the coloring effect resulting from such interaction, but can only speculate that it somehow influences the formation of the silver halide crystals which give rise to the photochromic behavior exhibited by the glass.

As was explained in U.S. Pat. No. 5,244,845, $Er_2O_3$ is frequently incorporated in photochromic glasses to confer a pleasing tint to the glass in the undarkened or faded state. To assure an essentially colorless appearance in the undarkened state (transmission of about 88–92% in the visible region of the radiation spectrum) in the present glasses, the use thereof will be limited to no more than about 0.5%. As was also observed in U.S. Pat. No. 5,244,845, Au can be added to deepen the darkened brown color of the glass. Such additions are unnecessary in the present glass and, if present, will not exceed 5 ppm.

Accordingly, the composition ranges of our inventive glasses consist essentially, in weight percent, of

| $SiO_2$ | 54–58 | $TiO_2$ | 0–2 | PbO | 0–0.8 |
|---|---|---|---|---|---|
| $B_2O_3$ | 18–22 | $ZrO_2$ | 2–4.5 | $Sb_2O_3$ | 0–0.2 |
| $Al_2O_3$ | 7–8 | Ag | 0.155–0.175 | Pd | 0.8–1.2 |
| $Li_2O$ | 3.75–4.5 | Cl | 0.3–0.4 | $Er_2O_3$ | 0–0.5 |
| $Na_2O$ | 0–1 | Br | 0.08–0.11 | Au | 0–5 ppm |
| $K_2O$ | 5.5–7.5 | CuO | 0.0065–0.01 | | | wherein the mole ratio $Li_2O:Na_2O \geq 9$.

DESCRIPTION OF PREFERRED EMBODIMENTS

In carrying out our investigations, the commercial batch of Corning Code 8154 glass was utilized, with additions of Pd made thereto. Excursions were made in a commercial continuous melting unit for the melting of optical glass compositions, the type of melting unit being referred to in the industry as a CU tank. Variations in Pd content and in the concentrations of the "photochromic elements" were made, and samples taken periodically for chromaticity coordinate measurements on ground and polished rectangular plates of 2 mm thickness. It was observed that, as the silver content was reduced and the Pd level held at about 1 ppm, the brown coloration retained a desirable chocolate hue, but the chromaticity coordinates shifted out of the trapezoid EFGHE of U.S. Pat. No. 5,244,845 and into area IJKLI, the approximate coordinate values for the corner points of that area being as follows:

| Point | x | y |
|---|---|---|
| I | 0.3560 | 0.3390 |
| J | 0.3640 | 0.3480 |
| K | 0.3690 | 0.3350 |
| L | 0.3615 | 0.3325 |

The single FIGURE in the appended drawing locates trapezoids ABCDA and EFGHE of U.S. Pat. No. 5,244,845 and cites the area IJKLI enclosing the present inventive glasses. Our most preferred glass composition is illustrated by a filled circle within area IJKLI and consists essentially, expressed in terms of parts by weight, of

| $SiO_2$ | 55.4 | $ZrO_2$ | 4.4 | Br | 0.096 |
|---|---|---|---|---|---|
| $B_2O_3$ | 20.6 | $TiO_2$ | 1.1 | CuO | 0.0079 |
| $Al_2O_3$ | 7.4 | PbO | 0.05 | $Er_2O_3$ | 0.25 |
| $Li_2O$ | 4.3 | Ag | 0.162 | $Sb_2O_3$ | 0.004 |
| $Na_2O$ | 0.7 | Cl | 0.35 | Pd | 0.9 ppm. |
| $K_2O$ | 6.1 | | | | |

Because the sum of those ingredients closely approximates 100, for all practical purposes the individual values may be deemed to represent weight percent.

Chromaticity coordinates Y, x, and y were measured on a Huntermeter. The measurements were made on the glass before exposure to ultraviolet radiation ($T_o$), after a darkening exposure for 20 minutes to ultraviolet radiation ($T_{D20}$), and after five minutes' fading upon removal from the ultraviolet radiation ($T_{F5}$). Those values are reported below:

|   | $T_o$ | $T_{D20}$ | $T_{F5}$ |
|---|---|---|---|
| Y | 88.5 | 23.7 | 37.0 |
| x | 0.3132 | 0.3593 | 0.3290 |
| y | 0.3204 | 0.3371 | 0.3247 |

The presence of the $Er_2O_3$ provides a slight pinkish cast to the glass which is pleasant to the wearer of sunglasses or ophthalmic lenses. Its removal will increase the transmission of the glass in the undarkened state.

We claim:

1. A composition for a photochromic glass which is essentially colorless in the undarkened state consisting essentially, expressed in terms of weight percent, of

| $SiO_2$ | 54–58 | $TiO_2$ | 0–2 | PbO | 0–0.8 |
|---|---|---|---|---|---|
| $B_2O_3$ | 18–22 | $ZrO_2$ | 2–4.5 | $Sb_2O_3$ | 0–0.2 |
| $Al_2O_3$ | 7–8 | Ag | 0.155–0.175 | $Er_2O_3$ | 0–0.5 |
| $Li_2O$ | 3.75–4.5 | Cl | 0.3–0.4 | Au | 0–5 ppm |
| $Na_2O$ | 0–1 | Br | 0.08–0.11 | Pd | 0.8–1.2 ppm |
| $K_2O$ | 5.5–7.5 | CuO | 0.0065–0.01 | | | wherein the mole ratio $Li_2O:Na_2O \geq 9:1$, said glass at a thickness of 2 mm exhibiting a coloration in the fully darkened state corresponding to the chromaticity coordinates, in accordance with the 1931 C.I.E. trichromatic colorimetric system, falling within area IJKLI in the appended drawing.

2. A composition in accordance with claim 1 consisting in approximate weight percent, of

| $SiO_2$ | 55.4 | $ZrO_2$ | 4.4 | Br | 0.096 |
|---|---|---|---|---|---|
| $B_2O_3$ | 20.6 | $TiO_2$ | 1.1 | CuO | 0.0079 |
| $Al_2O_3$ | 7.4 | PbO | 0.05 | $Er_2O_3$ | 0.25 |
| $Li_2O$ | 4.3 | Ag | 0.162 | $Sb_2O_3$ | 0.004 |
| $Na_2O$ | 0.8 | Cl | 0.35 | Pd | 0.9 ppm. |
| $K_2O$ | 6.1 | | | | |

3. A photochromic glass lens which is essentially colorless in the undarkened state consisting essentially, expressed in terms of weight percent, of

| $SiO_2$ | 54–58 | $TiO_2$ | 0–2 | PbO | 0–0.8 |
|---|---|---|---|---|---|
| $B_2O_3$ | 18–22 | $ZrO_2$ | 2–4.5 | $Sb_2O_3$ | 0–0.2 |
| $Al_2O_3$ | 7–8 | Ag | 0.155–0.175 | $Er_2O_3$ | 0–0.5 |
| $Li_2O$ | 3.75–4.5 | Cl | 0.3–0.4 | Au | 0–5 ppm |
| $Na_2O$ | 0–1 | Br | 0.08–0.11 | Pd | 0.8–1.2 ppm |
| $K_2O$ | 5.5–7.5 | CuO | 0.0065–0.01 | | | wherein the mole ratio $Li_2O:Na_2O \geq 9:1$, said glass at a thickness of 2 mm exhibiting a coloration in the fully darkened state corresponding to the chromaticity coordinates, in accordance with the 1931 C.I.E. trichromatic colorimetric system, falling within area IJKLI in the appended drawing.

4. A photochromic glass lens in accordance with claim 3 consisting in approximate weight percent, of

| $SiO_2$ | 55.4 | $ZrO_2$ | 4.4 | Br | 0.096 |
|---|---|---|---|---|---|
| $B_2O_3$ | 20.6 | $TiO_2$ | 1.1 | CuO | 0.0079 |
| $Al_2O_3$ | 7.4 | PbO | 0.05 | $Er_2O_3$ | 0.25 |
| $Li_2O$ | 4.3 | Ag | 0.162 | $Sb_2O_3$ | 0.004 |
| $Na_2O$ | 0.8 | Cl | 0.35 | Pd | 0.9 ppm. |
| $K_2O$ | 6.1 | | | | |

5. A composition for a photochromic glass which is essentially colorless in the undarkened state consisting essentially, expressed in terms of weight percent, of

| $SiO_2$ | 54–58 | Ag | 0.155–0.175 |
|---|---|---|---|
| $B_2O_3$ | 18–22 | Cl | 0.3–0.4 |
| $Al_2O_3$ | 7–8 | Br | 0.08–0.11 |
| $Li_2O$ | 3.75–4.5 | CuO | 0.0065–0.01 |
| $K_2O$ | 5.5–7.5 | Pd | 0.8–1.2 ppm |
| $ZrO_2$ | 2–4.5 | | | wherein said glass at a thickness of 2 mm, exhibits a coloration in the fully darkened state corresponding to the chromaticity coordinates, in accordance with the 1931 C.I.E. trichromatic colorimetric system, falling within area IJKLI in the appended drawing.

6. A composition in accordance with claim 5 further consisting, expressed in terms of weight percent, of

| $Na_2O$ | 0–1 | $Er_2O_3$ | 0–0.5 |
|---|---|---|---|
| $TiO_2$ | 0–2 | $Sb_2O_3$ | 0–0.2 |
| PbO | 0–0.8 | Au | 0–5 ppm. |

7. A composition in accordance with claim 6, wherein the mole ratio $Li_2O:Na_2O \geq 9:1$.

* * * * *